(12) United States Patent
Fujita

(10) Patent No.: US 7,511,822 B2
(45) Date of Patent: Mar. 31, 2009

(54) OPTICAL TOMOGRAPHIC IMAGING APPARATUS

(75) Inventor: Hiroshi Fujita, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 54 days.

(21) Appl. No.: 11/524,377

(22) Filed: Sep. 21, 2006

(65) Prior Publication Data
US 2007/0064239 A1   Mar. 22, 2007

(30) Foreign Application Priority Data
Sep. 22, 2005   (JP)   ............................. 2005-276122

(51) Int. Cl.
*G01B 9/02* (2006.01)
(52) U.S. Cl. .................................................. 356/479
(58) Field of Classification Search ................. 356/477, 356/479, 484, 497; 250/227.19, 227.27; 385/12
See application file for complete search history.

(56) References Cited

U.S. PATENT DOCUMENTS

| | | | | |
|---|---|---|---|---|
| 6,069,698 | A * | 5/2000 | Ozawa et al. | 356/511 |
| 6,111,645 | A * | 8/2000 | Tearney et al. | 356/499 |
| 6,377,349 | B1 * | 4/2002 | Fercher | 356/497 |
| 6,654,127 | B2 * | 11/2003 | Everett et al. | 356/479 |
| 7,023,558 | B2 * | 4/2006 | Fee et al. | 356/479 |
| 7,133,137 | B2 * | 11/2006 | Shimmick | 356/497 |
| 7,180,600 | B2 * | 2/2007 | Horii et al. | 356/479 |
| 2004/0239942 | A1 | 12/2004 | Sun | |
| 2004/0254474 | A1 * | 12/2004 | Seibel et al. | 600/473 |

FOREIGN PATENT DOCUMENTS

WO   WO-98/52021 A1   11/1998

OTHER PUBLICATIONS

Rollins et al., Optics Express, Sep. 14, 2998, pp. 219-229, vol. 3, No. 6.

\* cited by examiner

*Primary Examiner*—Michael A Lyons
(74) *Attorney, Agent, or Firm*—Birch, Stewart, Kolasch & Birch, LLP

(57) ABSTRACT

OCT measuring that uses an optical fiber and is capable of preventing degradation in the resolution due to the wavelength dispersion of the optical fiber. For controlling the optical path length of the reference light in the OCT measuring, the following are provided: a diffraction grating element for dispersing the reference light; a collimator lens for collimating the dispersed reference light; and a reflection mirror for reflecting the reference light transmitted through the collimator lens back to the collimator lens and inputting to the diffraction grating element. The reflection mirror pivots on a position offset from the optical axis of the collimator lens. The diffraction grating element is tilted with respect to the optical axis of the collimator lens to compensate for the wavelength dispersion of the optical fiber.

1 Claim, 7 Drawing Sheets

← λ long    λ short

← λ long    λ short

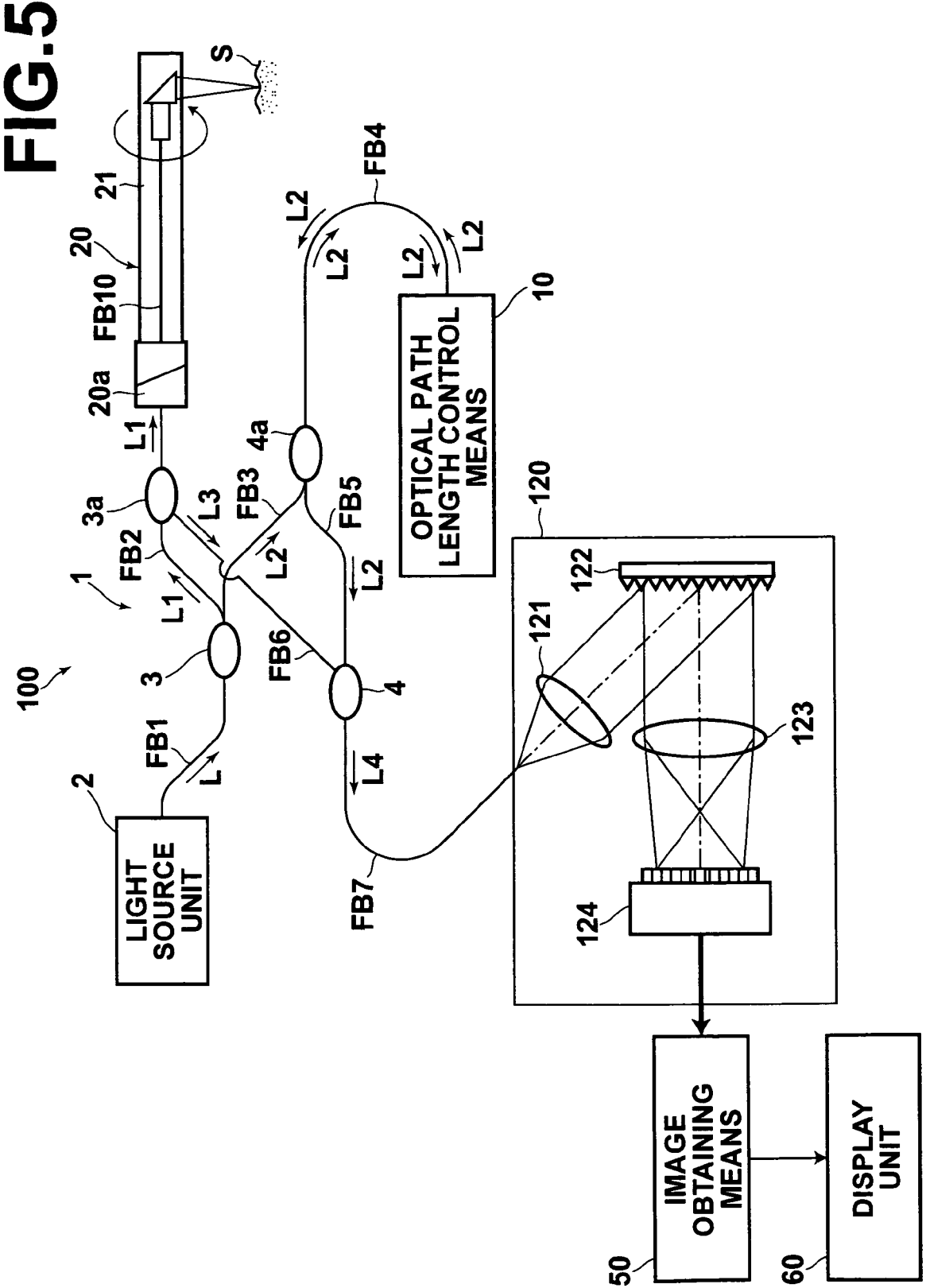

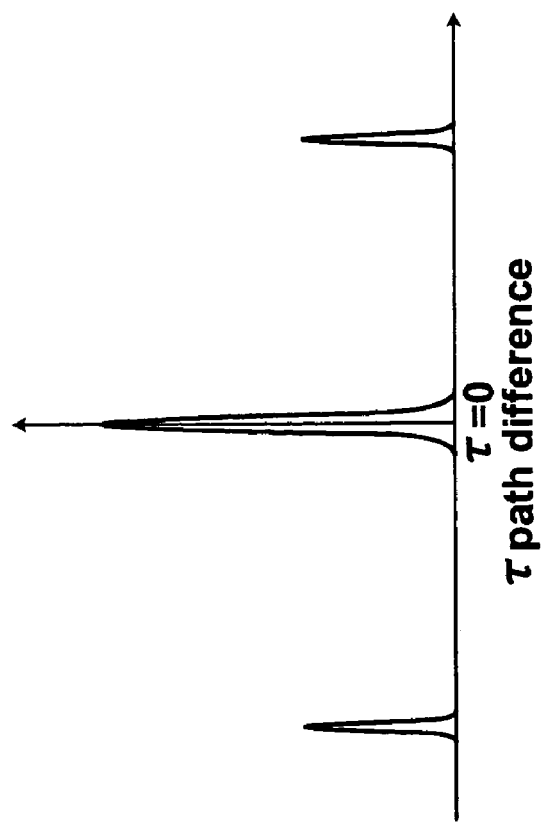
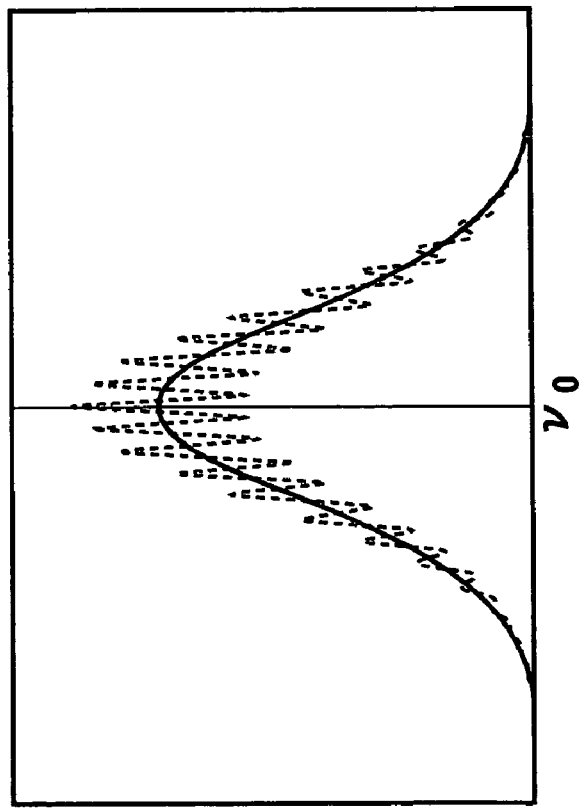
FIG.6A
FIG.6B

OPTICAL TOMOGRAPHIC IMAGING APPARATUS

BACKGROUND OF THE INVENTION

1. Field of the Invention

The present invention relates to an optical tomographic imaging apparatus for obtaining a tomgraphic image of a measuring object. In particular, the present invention relates to an optical tomographic imaging apparatus suited for obtaining a tomographic image of a measuring object such as a living tissue in a body cavity or the like.

2. Description of the Related Art

Electronic endoscope apparatuses are spread widely and used in various fields as the endoscope apparatus for observing inside of the cavity of a living body. The electronic apparatus obtains an image of a living body using reflected light reflected from the living body illuminated by illumination light and displays it on the monitor. Most of the endoscope apparatuses have a mouth forceps to allow a probe to be introduced inside of the body cavity through the forceps channel to perform a biopsy or treatment of the tissue within the cavity.

As the endoscope apparatus described above, an ultrasonic tomographic imaging apparatus that uses an ultrasonic wave and the like are also known. Further, an optical tomographic imaging apparatus using OCT (Optical Coherence Tomography) is proposed as described, for example, in U.S. Patent Application Publication No. 2004/0239942. In the apparatus disclosed in U.S. Patent Application Publication No. 2004/0239942, low coherence light outputted from the light source unit is split into measuring light and reference light, and the measuring light is irradiated on a measuring object, and the reflected light reflected from the measuring object is guided to the light combining means. Then, the reflected light is combined with the reference light by the light combining means, and the interference light produced by the mixing of the reflected light with reference light is measured through heterodyne detection or the like.

Here, when the measuring light is irradiated on the measuring object, a probe is used, which is inserted into the body cavity from the mouth forceps through the forceps channel. The probe includes an optical fiber for guiding the measuring light, and a rotatable mirror provided at the tip of the optical fiber for reflecting the measuring light in the orthogonal direction. The measuring light is irradiated on the measuring object in the body cavity from the probe, and the reflected light reflected from the measuring object is guided to the light combining means again through the optical fiber of the probe.

In the mean time, in the OCT measuring described above, resolution in the dept direction is dependent on the spectral width of the light used, that is, the greater the spectral width, the greater the resolution. Consequently, U.S. Patent Application Publication No. 2004/0239942 proposes to perform OCT measuring using an ultra-broadband light source.

Here, one of the optical guiding methods is known in which the measuring light, reflected light, and reference light are guided through optical fibers, in addition to the method in which they are guided through the atmosphere (bulk type). When the broadband light is guided through the optical fiber, however, the dispersion of the light becomes significant due to the dispersion properties of the optical fiber. This causes a problem that the resolution in the depth direction is degraded. Further, even if the OCT measuring is structured in the bulk type, there is no other way than to use an optical fiber for guiding the measuring light when obtaining a tomographic image inside of the body cavity. That is, when obtaining a tomographic image by inserting the probe into the body cavity, the image is degraded due to the dispersion properties of the optical fiber of the probe.

It is an object of the present invention, therefore, to provide an optical tomographic imaging apparatus that uses an optical fiber for OCT measuring, yet capable of preventing degradation of the resolution due to the dispersion properties of the optical fiber.

SUMMARY OF THE INVENTION

The optical tomographic imaging apparatus of the present invention is an apparatus for obtaining a tomographic image of a measuring object, comprising:

a light source unit for outputting light;

a light splitting means for splitting the light outputted from the light source unit into measuring light and reference light;

an optical path length control means for controlling the optical path length of either the measuring light or the reference light split by the light splitting means;

a probe having an optical fiber for guiding the measuring light split by the light splitting means to the measuring object;

a light combining means for combining reflected light reflected from the measuring object when the measuring light outputted from the probe is irradiated thereon with the reference light;

an interference light detecting means for detecting interference light between the reflected light and the reference light combined by the light combining means;

an image obtaining means for obtaining a tomographic image of the measuring object from the interference light detected by the interference light detecting means; and a dispersion compensating means for compensating for the wavelength dispersion caused by the optical fiber of the probe.

Here, the optical path length control means may be a means for controlling the optical path length of either the measuring light or the reference light. Further, it may have any form as long as it is capable of controlling the optical path length of either the measuring light or the reference light. For example, if the optical path length control means is constructed to control the optical path length of the reference light, it may include: a diffraction grating element for dispersing the reference light split by the light splitting means; a collimator lens for collimating the reference light dispersed by the diffraction grating element; a reflection mirror for reflecting the reference light transmitted through the collimator lens back to the collimator lens and inputting to the diffraction grating element, the reflection mirror pivoting on a position offset from the optical axis of the collimator lens; and a mirror for reflecting the reference light inputted to the diffraction grating element by the reflection mirror and dispersed from the diffraction grating element back to the diffraction grating element.

The dispersion compensating means may be provided by any method as long as it is capable of compensating for the wavelength dispersion caused by the optical fiber. For example, if the optical fiber has positive dispersion properties, an optical fiber having negative dispersion properties may by inserted in the optical path of the measuring light as the dispersion compensating means. Alternatively, it may be formed by tilting the diffraction grating element of the optical path length control means with respect to the optical axis of the collimator lens.

The optical tomographic imaging apparatus may be an apparatus for obtaining a tomographic image using, for example, TD-OCT (Time Domain Optical Coherence Tomography) measuring, in which the optical light source outputs low coherence light, and the optical path length control means changes the depth position to be measured according to the pivoting of the reflection mirror.

Further, the optical tomographic imaging apparatus may be an apparatus for obtaining a tomographic image using, for example, SD-OCT (Spectral Discrimination Optical Coherence Tomography) measuring, in which the optical light source outputs low coherence light, the optical path length control means adjusts the start position of the measurement according to the pivoting of the reflection mirror, and the image obtaining means obtains a tomographic image of the measuring object by detecting the intensity of the reflected light reflected from each depth position of the measuring object through the frequency analysis of the interference light.

Still further, the optical tomographic imaging apparatus may be an apparatus for obtaining a tomographic image using, for example, SS-OCT (Swept Source Optical Coherence Tomography) measuring, in which the optical light source outputs laser light by varying the wavelength thereof at a predetermined period, the optical path length control means adjusts the start position of the measurement according to the pivoting of the reflection mirror, and the image obtaining means obtains a tomographic image of the measuring object by detecting the intensity of the reflected light reflected from each depth position of the measuring object through frequency analysis of the interference light.

The optical tomographic imaging apparatus of the present invention includes: a probe having an optical fiber for guiding measuring light split by a light splitting means, and a dispersion compensating means for compensating for the wavelength dispersion caused by the optical fiber of the probe. Therefore, even in a case where an optical fiber is required in order to obtain a tomographic image inside of a body cavity, the wavelength dispersion caused by the optical fiber is compensated by the dispersion compensating means, so that image quality degradation due to wavelength dispersion of the optical fiber may be prevented.

If a configuration is adopted in which the optical path length control means controls the optical path length of reference light and includes: a diffraction grating element for spectrally dispersing the reference light; a collimator lens for collimating the reference light dispersed by the diffraction grating element; and a reflection mirror for reflecting the reference light collimated by the collimating lens back to the collimator lens, and a dispersion compensating means is formed by tilting the diffraction grating element with respect to the optical axis of the collimator lens, then the optical path length control means for controlling the optical path length of the reference light required for OCT measuring may also have the dispersion compensating function, so that the dispersion compensation may be implemented by a simple structure without requiring additional structures.

Further, even when a configuration is adopted in which the light source unit outputs low coherent light, and the depth position to be measured is changed according to the pivoting of the reflection mirror, the wavelength dispersion of the optical fiber is compensated by the dispersion compensating means, so that the image quality degradation due to the wavelength dispersion of the optical fiber may be prevented.

Still further, even when a configuration is adopted in which the light source unit outputs laser light by varying the wavelength at a predetermined period; the interference light detecting means detects the intensity of the reflected light reflected from the depth position of a measuring object based on the frequency and intensity of the interference light; and the optical path length control means changes the depth position of the measuring object to be measured according to the pivoting of the reflection mirror, the wavelength dispersion of the optical fiber is compensated by the dispersion compensating means, so that the image quality degradation due to the wavelength dispersion of the optical fiber may be prevented.

Further, even when a configuration is adopted in which the light source unit outputs low coherence light; the interference light detecting means detects the intensity of the reflected light reflected from each depth position of a measuring object based on the frequency and intensity of the interference light; and the optical path length control means changes the depth position of the measuring object to be measured according to the pivoting of the reflection mirror, the wavelength dispersion of the optical fiber is compensated by the dispersion compensating means, so that the image quality degradation due to the wavelength dispersion of the optical fiber may be prevented.

BRIEF DESCRIPTION OF THE DRAWINGS

FIG. 5 is a schematic view of another embodiment of the optical tomographic imaging apparatus of the present invention, illustrating the construction thereof.

FIGS. 6A, 6B are graphs illustrating example interference light detected by the interference light detecting means shown in FIG. 5.

DESCRIPTION OF THE PREFERRED EMBODIMENTS

Figure 1:
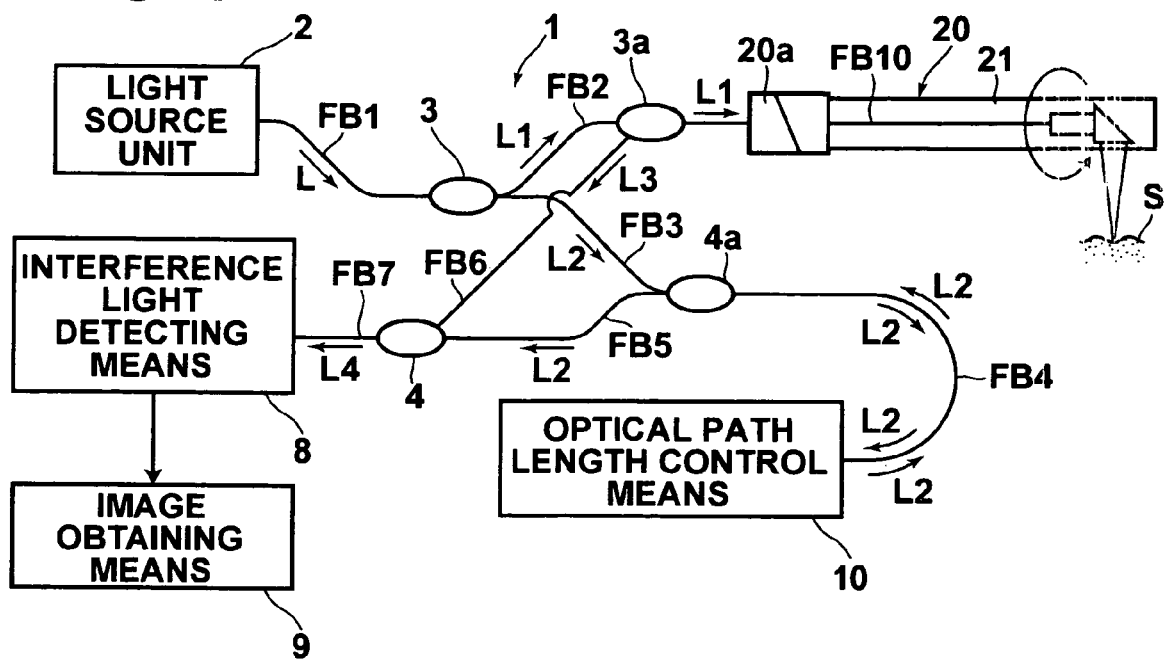
FIG. 1 is a schematic view of an exemplary embodiment of the optical tomographic imaging apparatus of the present invention, illustrating the construction thereof.

Hereinafter, exemplary embodiments of the optical tomographic imaging apparatus of the present invention will be described in detail with reference to the accompanying drawings. FIG. 1 is a construction diagram of a first embodiment of the optical tomographic imaging apparatus of the present invention. The optical tomographic imaging apparatus 1 is an apparatus for obtaining a tomographic image by so-called TD-OCT (Time Domain Optical Coherence Tomography) measuring. It includes: a light source unit 2 for outputting light; a light splitting means 3 for splitting the light outputted from the light source unit 2 into measuring light L1 and reference light L2; a light combining means 4 for combining reflected light L3 and the reference light L2; an interference light detecting means 8 for detecting interference light L4 produced when the reflected light L3 is combined with the reference light L2 by the light combining means 4; and an image obtaining means 9 for obtaining an optical tomographic image of a measuring subject S from the interference light L4 detected by the interference light detecting means 8.

Here, the light source unit 2 is constituted, for example, by SLD (Super Luminescent Diode), ASE (Amplified Spontaneous Emission), or the like, that outputs low coherence pulse light L to an optical fiber FB1. The optical tomographic imaging apparatus 1 is an apparatus for obtaining a tomographic image of a living organism in a body cavity as the measuring object S. Preferably, for example, a broadband spectral ultra short pulse laser light source, or the like is used as the light source unit 2, in order to minimize optical attenuation due to scattering and absorption when the light is transmitted through the measuring object S.

The light splitting means 3 is constituted, for example, by a 2×2 optical fiber coupler, and splits the low coherence light L guided thereto from the optical light source unit 2 through the optical fiber FB1 into the measuring light L1 and reference light L2. The light splitting means 3 is optically connected to two optical fibers FB2, FB3, and the measuring light L1 is guided by the optical fiber FB2, and the reference light L2 is guided by the optical fiber FB3.

The optical fiber FB2 is optically connected to a connector 20*a* of a probe 20 through an optical circulator 3*a*. The probe 20 is, for example, a probe to be inserted in a body cavity through the mouth forceps to guide the measuring light L1 guided by the optical fiber FB2 to the measuring object S. The probe 20 is constituted by a flexible tube 21 made of, for example, resin or the like, with an optical fiber FB10 accommodated therein. The measuring light L1 outputted from the probe 20 to the measuring object S is reflected from the measuring object S, and inputted to an optical fiber FB6 as reflected light L3 through the optical circulator 3*a*. The probe 20 is detachably attached to the connector 20*a* for disinfection and cleaning purposes after use.

In the mean time, the optical fiber FB3 is optically connected to an optical path length control means 10 through an optical circulator 4*a* and an optical fiber FB4. The optical path length control means 10 has the functions to vary the optical path length of the reference light L2 for changing the measuring position of the measuring object in the depth direction, and to slightly shift the frequency of the reference light L2. The reference light L2 changed in the optical path length and shifted in the frequency by the optical path length control means 10 is guided to the light combining means 4 through the optical fiber FB4, optical circulator 4*a*, and optical fiber FB5.

The light combining means 4 is constituted by a 2×2 optical fiber coupler, and combines the reference light L2 shifted in the frequency and changed in the optical path length by the optical path length control means 10 with the reflected light L3 reflected from the measuring object S, and outputs the resultant interference light L4 to the interference light detecting means 8 through optical fiber FB7.

The interference light detecting means 8 detects the optical intensity of the interference light produced by the reflected light L3 and the reference light L2. Here, a beat signal pulsating at a differential frequency between the reference light L2 and the reflected light L3 is generated when the sum of the total optical path length of the measuring light L1 and the total optical path length of the reflected light corresponds to the total optical path length of the reference light L2. As the optical path length of the reference light L2 is varied by the optical path length control means 10, the measuring position (depth) of the measuring object is changed, so that the interference light detecting means 8 is structured to detect the beat signal at each measuring position. The image obtaining means 9 obtains a tomographic image based on the intensity of the interference light L4 detected by the interference light detecting means 8, and the measured depth position determined by the changed amount in the optical path length by the optical path length control means 10. The interference light detecting means 8 shown in FIG. 1 has the function to adjust the balance between the optical intensity of the light L branched from the optical coupler 3 of the optical fiber FB1 and guided by the optical fiber FB 6, and the optical intensity of the interference light L4.

Hereinafter, the optical path length control means 10 will be described with reference to FIG. 2, which is a schematic view of an example of the optical path length control means 10. The optical path length control means 10 is an optical path length control means known as RSOD (Rapid Scanning Optical Delay Line). The basic principle is described in detail in the literature entitled "In vivo video rate optical coherence tomography" by Andrew M. Rollins, Manish D. Kulkarni, Siavash Yazdanfar, Tujchai Ung-arunyawee, and Joseph A. Izatt, Opt. Express 6,219-229 (1998) (hereinafter, referred to as RSOD literature), and International Application Publication No. WO98/52021.

The optical path length control means 10 includes: a diffraction grating element 12 for spectrally dispersing the reference light L2; a collimator lens 13 for collimating the reference light L2 dispersed by the diffraction grating element 12; a reflection mirror 14 for reflecting the reference light L2 collimated by the collimator lens 13 back to the collimator lens 13 and inputting to the diffraction grating element 12, which pivots on a position offset from the optical path LL of the collimator lens 13; and a mirror 15 for reflecting the reference light L2 inputted to the diffraction grating element 12 from the reflection mirror 14 and dispersed from the diffraction grating element 12 back to the diffraction grating element 12.

The diffraction grating element 12 spectrally disperses the reference light L2 inputted from the optical fiber FB4 through the collimator lens 11 at a predetermined angle toward the collimator lens 13. The collimator lens 13 is constituted, for example, by a Fourier transform lens, and has the function to collimate the reference light L2 dispersed by the diffraction grating 12.

The reflection mirror 14 is disposed at a position away from the collimator lens 13 by the distance corresponding to the focal length If of the collimator lens 13. The reflection mirror 14 is pivoted rapidly in the arrow a direction on a position which is offset from the optical axis LL of the collimator lens 13. The change in the tilt amount of the reflection mirror 14 causes an optical delay in the reference light L2 transmitted through the collimator lens 13, and the optical path length thereof is changed. The variation of the optical path length implemented by the optical path length control means 10 is, for example, 2 mm, which is the measurable range of the measuring object in the depth direction. Further, change in the pivot center of the reflection mirror 14 results in the amount of phase delay to be changed, and thereby the amount of frequency shift may be changed. Thus, the frequency-shifted reference light L2 is inputted back to the optical fiber FB4.

That is, the reference light L2 is propagated to the reflection mirror 14 through the diffraction grating element 12 and collimator lens 23, then from the reflection mirror 14 to the mirror 15 through the collimator lens 13 and diffraction grating element 12. Further, the reference light L2 is reflected from the mirror 15 and propagated to the reflection mirror 14 through the diffraction grating element 12 and collimator lens 13, then from the reflection mirror 14 to the optical fiber FB4 through the collimator lens 13 and diffraction grating element 12.

Hereinafter, exemplary operation of the optical tomographic imaging apparatus 1 will be described with reference to FIGS. 1 and 2. When broadband low coherence light L is outputted from the light source unit 2, the low coherence light L is split into the measuring light L1 and reference light L2 by the light splitting means 3. The optical path length of the reference light L2 is changed by the optical path length control means 10 with a slight frequency shift, while the measuring light L1 is guided into the body cavity by the probe 20 and irradiated on the measuring object S. Then, the reflected light L3 reflected from the measuring object S is combined with the reference light L2, and the interference light L4 between the reflected light L3 and the reference light L2 is detected by the interference light detecting means 8 as a beat signal. Based on the detected interference light L4, a tomographic image of the measuring object S is obtained by the image obtaining means 9.

As described above, the low coherence light L, measuring light L1, and reference light L2 are guided through the optical fibers FB1 to FB7. Further, the measuring light L1 is guided to the measuring object S through the optical fiber FB10 of the probe 20. For example, single mode fibers or the like are used as the optical fibers FB1 to FB7 and FB10, and the cores thereof are made of quartz or the like. This causes a problem that different wavelengths have different optical path lengths due to large wavelength dispersion in the optical fibers FB1 to FB7 and FB10, which has a significant impact on the broadband low coherence light L.

Figure 3A:
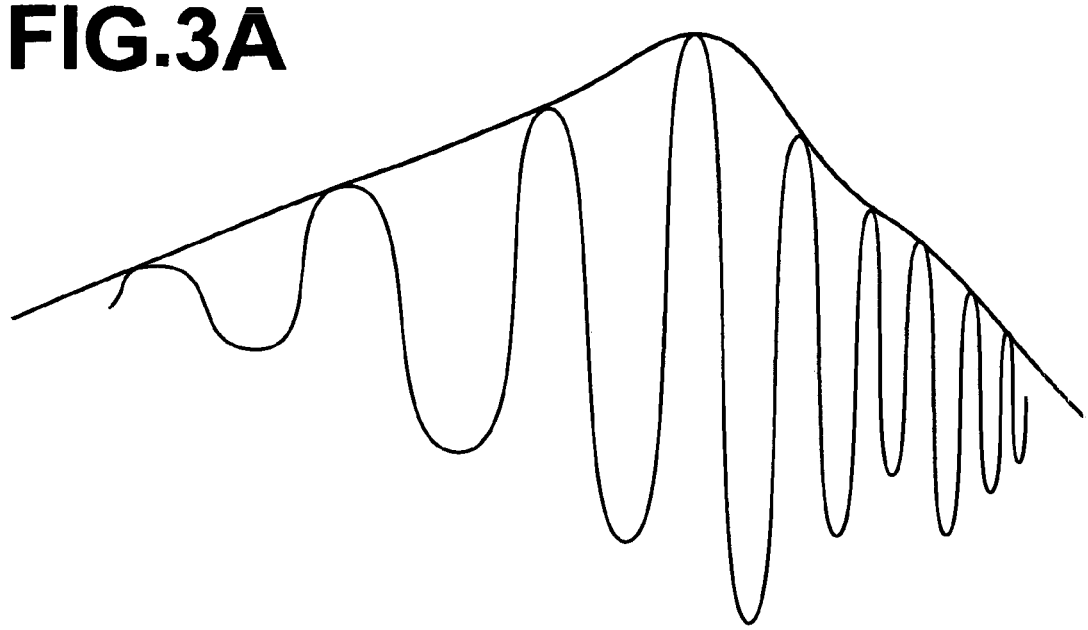
FIGS. 3A, 3B are graphs illustrating example interference light detected by the interference light detecting means shown in FIG. 1.

More specifically, FIG. 3A shows a waveform of the interference light L4 when optical fibers having dispersion properties that broaden the pulse width are used as the optical fibers FB1 to FB7 and FB10. In FIG. 3A, the optical path length differs for each wavelength range of the interference light L4 due to the dispersion properties of the optical fibers FB1 to FB7 and FB10, so that the interference light L4 is dissociated into each of the wavelength ranges and the wavelength range of the interference light L4 is broadened. Consequently, all that is obtained is a broad envelope, even if waveform shaping, filtering, and the like are performed on the interference light detected by the interference light detecting means 8. That is, the tomographic image obtained by the image obtaining means 9 has undesirable resolution in the dept direction, causing degradation in the image quality.

Consequently, the optical tomographic imaging apparatus 1 includes a dispersion compensating means for compensating for the dispersion properties of the optical fibers FB1 to FB7 and FB10 used in the OCT interferometer. More specifically, the dispersion compensating means is formed by tilting the diffraction grating element 12 with respect to the optical axis LL of the collimator lens 13 as shown in FIG. 2 (angle θ in FIG. 2). This causes group velocity dispersion to occur when the dispersed reference light L2 is inputted to the diffraction grating element 12 from the reflection mirror 14 through the collimator lens 13, and the difference is developed in the optical path length between each of the spectral elements. In this way, negative dispersion properties are produced by the group velocity dispersion arising from the inclination of the diffraction grating element 12.

Figure 3B:
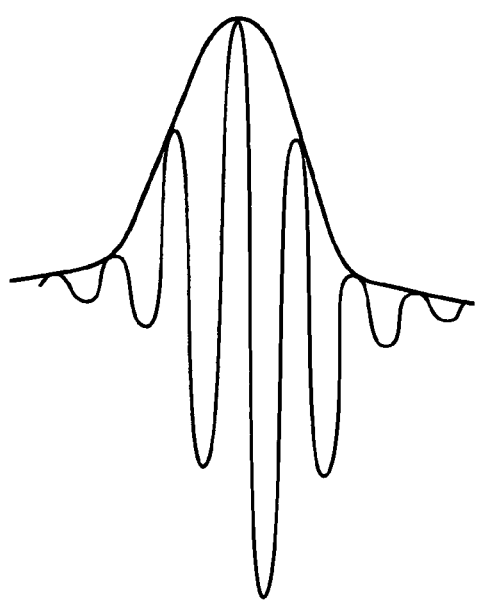
Figure 4A:
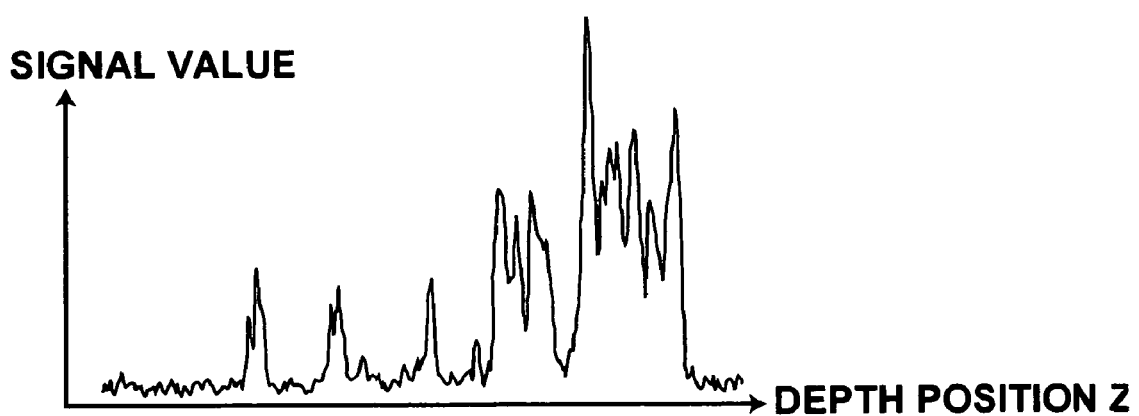
FIGS. 4A, 4B are graphs illustrating example interference light detected by the interference light detecting means shown in FIG. 1.
Figure 4B:
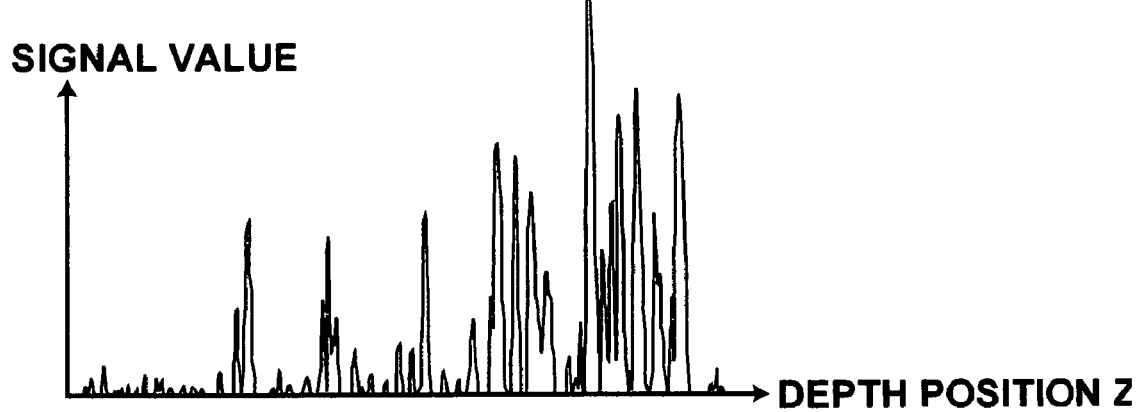

That is, the positive dispersion properties of the optical fibers FB1 to FB7 and FB10 are cancelled out by the negative dispersion properties of the dispersion compensating means, and the wavelength dispersion caused by the optical fibers FB1 to FB7 and FB10 is compensated by the dispersion compensating means. Consequently, as shown in FIG. 3B, the interference light L4 is not dissociated into each wavelength and a sharp envelope may be obtained. In the conventional apparatus in which no dispersion compensation is implemented, only tomographic image data having blunt peaks as shown in FIG. 4A are obtained. In contrast, a clear tomographic image having high resolution as shown in FIG. 4B may be obtained by implementing dispersion compensation.

The aforementioned RSOD literature describes that the diffraction grating element 12 is disposed orthogonal to the optical axis LL of the collimator lens 13 in order to prevent introduction of group velocity dispersion on page 5, last paragraph continuing on the next page. In contrast, the optical tomographic imaging apparatus 1 proactively introducing the group velocity dispersion by tilting the diffraction grating element 12 with respect to the optical axis of the collimator lens 13 to cancel out the wavelength dispersion caused by the optical fibers.

FIG. 5 is a schematic view of another embodiment of the optical tomographic imaging apparatus of the present invention, illustrating the construction thereof. The optical tomographic imaging apparatus 100 will now be described with reference to FIG. 5. In the optical tomographic imaging apparatus 100 shown in FIG. 5, components having identical structures to those in the optical tomographic imaging apparatus 1 shown in FIG. 1 are given the same reference numerals, and will not be elaborated upon further here.

The optical tomographic imaging apparatus 100 is an apparatus for obtaining a tomographic image by performing so-called SD-OCT measuring. The interference detecting means 120 includes: a light dispersion means 122 for dispersing the interference light L4 having a plurality of wavelength ranges into each range; and a light detecting means 124 provided for each wavelength range of the interference light L4 dispersed by the light dispersion means 122. The light dispersion means 122 is constituted, for example, by a diffraction grating element or the like, and disperses the interference light L4 inputted from an optical fiber FB7 through a collimator lens 121 to the light detecting means 124.

The light detecting means 124 is constituted, for example, by a plurality of optical sensors, such as CCD or the like, disposed one or two dimensionally, and each wavelength range of the interference light L4 inputted through an optical system 123 is detected by each optical sensor. Here, the interference light 4 having the spectrum of the light source unit 2 and the spectrum obtained by Fourier transforming the reflection information function superimposed thereon is observed at the light detecting means 124. The image obtaining means 50 obtains the reflection information at each depth position z through frequency analysis of the interference light L4 detected by the interference light detecting means 120.

Figure 2:
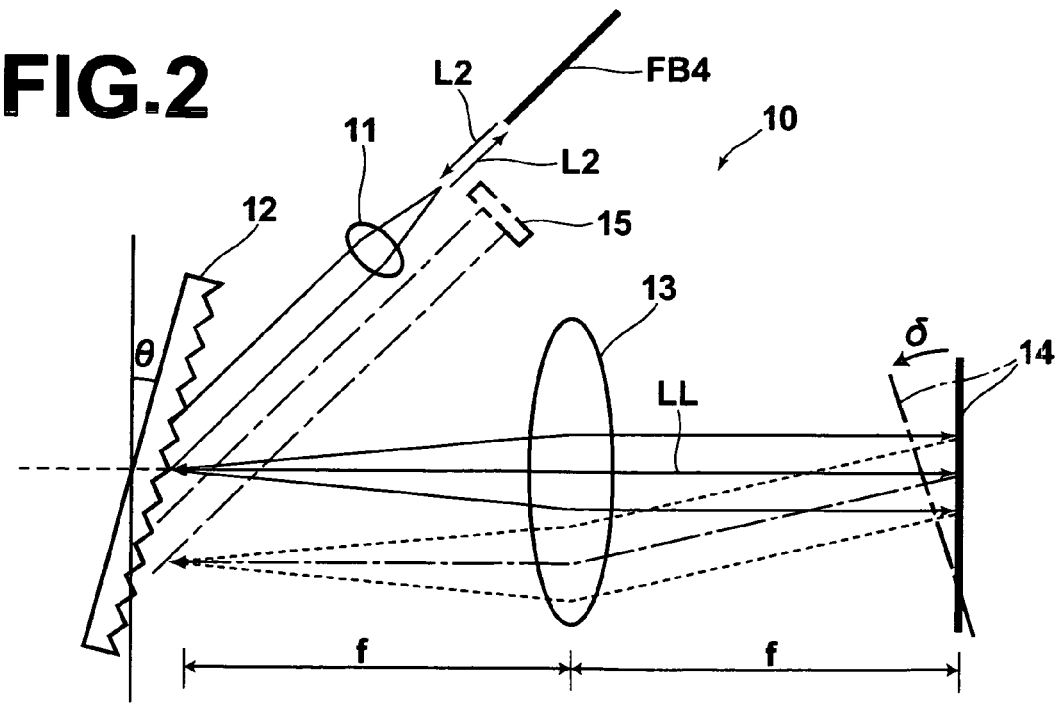
FIG. 2 is a schematic view of an example optical path length control means in the optical tomographic imaging apparatus shown in FIG. 1.

Here, the optical path length control means 10 has a function to control the optical path length in order to adjust the start position of the measurement, and constructed in the same manner as that shown in FIG. 2. Consequently, the wavelength dispersion caused by the optical fiber FB1 to FB7 and FB10 is compensated by the dispersion compensating means, and thereby image quality degradation due to wavelength dispersion may be prevented.

Figure 7A:
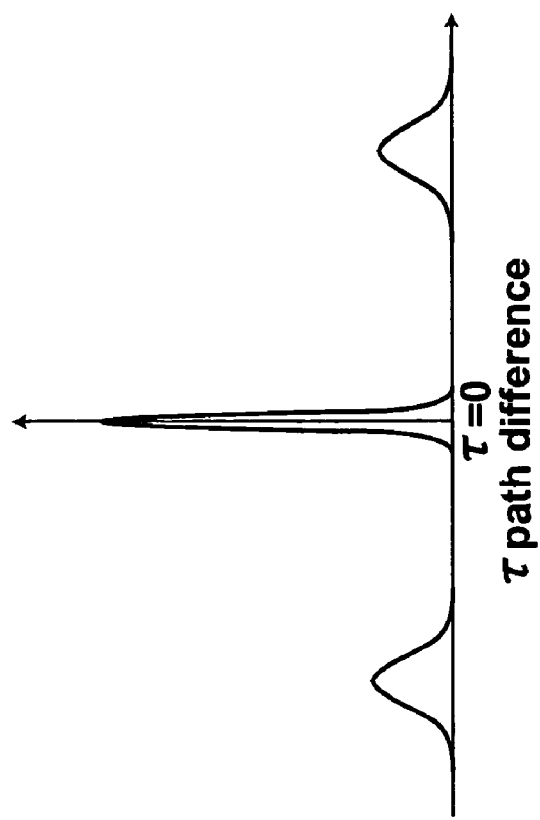
FIGS. 7A, 7B are graphs illustrating example interference light detected by the interference light detecting means in the conventional optical tomographic imaging apparatus.
Figure 7B:
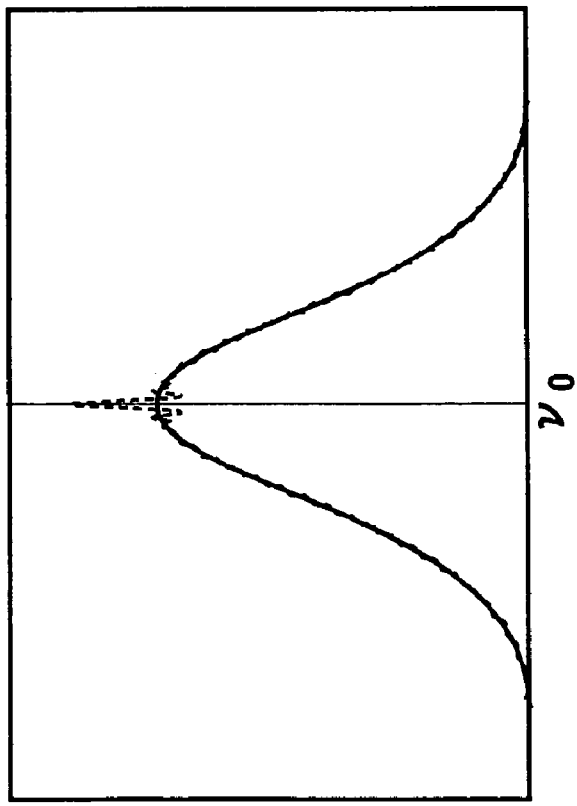

More specifically, when the dispersion compensating means is formed in the optical path length control means 10, a waveform with sharp peaks is detected by the interference light detecting means 120 as shown in FIG. 6A. Consequently, the signal obtained by Fourier transforming the waveform detected by the image obtaining means 50 has also sharp peaks as shown in FIG. 6B. In contrast, if the dispersion compensating means is not formed in the optical path length control means 10, a waveform with blunt peaks is detected by the interference light detecting means 120 as shown in FIG. 7A. Consequently, the signal obtained by Fourier transforming the waveform detected by the image obtaining means 50 has also blunt peaks as shown in FIG. 7B. In this way, when performing so-called SD-OCT measuring, image quality degradation may be prevented by providing the dispersion compensating means.

It will be appreciated that the embodiments of the present invention are not limited to those described above. For example, in FIG. 1, a beat signal is detected by the interference light detecting means 8, but a configuration may be adopted in which the interference light L4 is directly detected as an interferogram function without providing a frequency difference between the measuring light L1 and the reference light L2.

Further, in the embodiment described above, the dispersion compensating means is formed by tilting the diffraction grating element 12 as an example. If, for example, the optical fiber FB10 has positive dispersion properties that broaden the pulse width, an optical fiber having negative dispersion properties may be used as the optical fiber FB6 that guides the reflected light L3 to compensate for the dispersion.

Further, in the embodiments described above, so-called TD-OCT measuring and SD-OCT measuring are described as examples, but SS-OCT (Swept Source OCT) measuring may also be used for obtaining a tomographic image. The SS-OCT measuring is detailed in Optical Technology Contact Vol. 41, No 7, pp 426-432, 2003.

Figure 8:
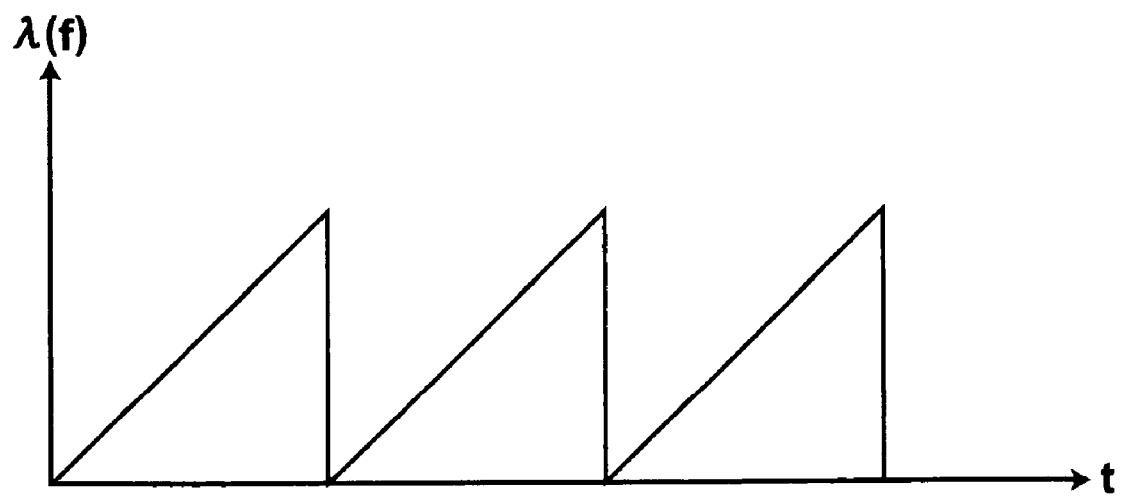
FIG. 8 is a graph illustrating a wavelength variation in a further embodiment of the optical tomographic imaging apparatus of the present invention.

Here, the optical light source 2 shown in FIG. 1 is constructed to output laser light L that varies in wavelength (frequency) with time as shown in FIG. 8. The image obtaining means 9 is constructed to obtain a tomographic image of a measuring object by detecting the intensity of the reflected light at each depth position of the measuring object through frequency analysis of the interference light L4. In this case also, the wavelength dispersion caused by the optical fiber FB1 to FB7 and FB10 is compensated by the dispersion compensating means, so that image quality degradation due to wavelength dispersion may be prevented.

What is claimed is:

1. An optical tomographic imaging apparatus for obtaining a tomographic image of a measuring object, comprising:

light source unit for outputting light;

light splitting means for splitting the light outputted from the light source unit into measuring light and reference light;

optical path length control means for controlling the optical path length of either the measuring light or the reference light split by the light splitting means;

a probe having an optical fiber for guiding the measuring light split by the light splitting means to the measuring object;

light combining means for combining reflected light reflected from the measuring object when the measuring light outputted from the probe is irradiated thereon with the reference light;

interference light detecting means for detecting interference light between the reflected light and the reference light combined by the light combining means;

image obtaining means for obtaining a tomographic image of the measuring object from the interference light detected by the interference light detecting means; and dispersion compensating means for compensating for the wavelength dispersion caused by the optical fiber of the probe, wherein:

the optical path length control means controls the optical path length of the reference light and includes:

a diffraction grating element for dispersing the reference light split by the light splitting means;

a collimator lens for collimating the reference light dispersed by the diffraction grating element;

a reflection mirror for reflecting the reference light transmitted through the collimator lens back to the collimator lens and inputting to the diffraction grating element, the reflection mirror pivoting on a position which is offset from the optical axis of the collimator lens; and a mirror for reflecting the reference light inputted to the diffraction grating element by the reflection mirror and dispersed from the diffraction grating element back to the diffraction grating element; and the dispersion compensating means is formed so as to have negative dispersion properties by tilting the diffraction grating element with respect to the optical axis of the collimator lens, in order to compensate positive dispersion properties generated by the optical fiber, and wherein:

the light source unit outputs laser light by varying with time the wavelength thereof at a predetermined period;

the optical path length control means adjusts the start position of the measurement according to the pivoting of the reflection mirror; and the image obtaining means obtains a tomographic image of the measuring object by detecting the intensity of the reflected light reflected from each depth position of the measuring object through frequency analysis of the interference light.

* * * * *